United States Patent [19]

Henning et al.

[11] Patent Number: 4,670,100

[45] Date of Patent: Jun. 2, 1987

[54] AQUEOUS SOLUTIONS OR DISPERSIONS OF POLYISOCYANATE ADDITION PRODUCTS, A PROCESS FOR THEIR PREPARATION, AND THEIR USE AS COATING COMPOUNDS OR AS SIZING AGENTS FOR PAPER

[75] Inventors: Wolfgang Henning, Kuerten; Walter Meckel, Neuss; Ulrich Beck, Bornheim; Heinz Bäumgen, Leverkusen; Joachim König, Odenthal, all of Fed. Rep. of Germany

[73] Assignee: Bayer Aktiengesellschaft, Leverkusen, Fed. Rep. of Germany

[21] Appl. No.: 876,526

[22] Filed: Jun. 19, 1986

[30] Foreign Application Priority Data

Jul. 4, 1985 [DE] Fed. Rep. of Germany ....... 3523856

[51] Int. Cl.$^4$ .................. C08L 75/00; D21H 3/48
[52] U.S. Cl. ................... 162/135; 162/164.6; 524/591; 524/839; 524/840
[58] Field of Search ........ 524/591, 839, 840; 162/135, 164.6

[56] References Cited

U.S. PATENT DOCUMENTS

| | | | |
|---|---|---|---|
| 3,036,998 | 5/1962 | Rudner | 260/77.5 |
| 3,388,087 | 6/1968 | Dieterich et al. | 260/29.2 |
| 3,480,592 | 11/1969 | Dieterich et al. | 260/77.5 |
| 3,686,108 | 8/1972 | Reiff et al. | 260/29.2 |
| 3,756,992 | 9/1973 | Dieterich | 260/77.5 |
| 4,028,310 | 6/1977 | Schafer et al. | 260/77.5 |
| 4,086,193 | 4/1978 | Reischl | 260/2.5 |
| 4,108,814 | 8/1978 | Reiff | 260/29.2 |
| 4,172,936 | 10/1979 | Schafer et al. | 528/49 |
| 4,623,416 | 11/1986 | Henning | 524/839 |

FOREIGN PATENT DOCUMENTS 880485   5/1953  Fed. Rep. of Germany .
1044404 11/1958  Fed. Rep. of Germany .
1058339  2/1967  United Kingdom .
1336050 11/1973  United Kingdom .

OTHER PUBLICATIONS

Angewandte Chemie 82, vol. 9, 1970, "Polyurethane Ionomers, A New Class of Block Polymers".

*Primary Examiner*—C. Warren Ivy
*Attorney, Agent, or Firm*—Gene Harsh; Joseph C. Gil; Thomas W. Roy

[57] ABSTRACT

The present invention relates to aqueous solutions or dispersions of polyisocyanate addition products which contain about 2 to 300 milliequivalents per 100 g of solids of chemically incorporated ternary or quaternary ammonium groups and up to about 25% by weight, based on solids, of chemically incorporated ethylene oxide units, —CH$_2$—CH$_2$—O—, present within a polyether chain, the ternary or quaternary ammonium groups and the ethylene oxide units being present in an amount sufficient to guarantee the solubility or dispersibility of the polyisocyanate addition products in water, characterized in that the polyisocyanate addition products have segments incorporated in the polymer chain which correspond to the following general formula

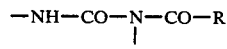

in an amount of about 0.1 to 20% by weight based on the above formula, but excluding the weight of R.

The present invention also relates to a process for the production of polyisocyanate addition products and to their use as coating agents for flexible or inflexible substrates and as sizing agents for paper or for the production sizing agents for paper.

3 Claims, No Drawings

AQUEOUS SOLUTIONS OR DISPERSIONS OF POLYISOCYANATE ADDITION PRODUCTS, A PROCESS FOR THEIR PREPARATION, AND THEIR USE AS COATING COMPOUNDS OR AS SIZING AGENTS FOR PAPER

BACKGROUND OF THE INVENTION

1. Field of the Invention

This invention relates to new solutions or dispersions of cationically and optionally non-ionically hydrophilically modified polyisocyanate addition products with built-in acyl urea groups, a process for their preparation and their use as coating compounds for flexible or rigid substrates or as sizes for paper.

2. Description of the Prior Art

Processes for the preparation of ionically modified polyurethanes are known and have been described, for example, in the following literature: DE-PS No. 880,485, DE-AS No. 1,044,404, U.S. Pat. No. 3,036,998, DE-PS No. 1,178,586, DE-PS No. 1,184,946, DE-AS No. 1,237,306, DE-AS No. 1,495,745, DE-OS No. 1,595,602, DE-OS No. 1,770,068, DE-OS NO. 2,019,324, DE-OS No. 2,035,732, DE-OS No. 2,446,440, DE-OS No. 2,345,256, DE-OS No. 2,345,245, DE-OS No. 2,427,274, U.S. Pat. No. 3,479,310 and Angewandte Chemie 82, 53 (1970) and Angew. Makromol. Chem. 26, 85 et seq. (1972).

The aqueous dispersions of the above mentioned polyurethanes may be used for a wide range of purposes, e.g. as adhesives or for coating various flexible or non-flexible substrates.

In spite of the large number of known processes and the products obtained from them, however, the demand persists for aqueous dispersions which have quite specific properties.

The process described below provides the possibility of a simple method of altering the properties of the products in the desired direction over a wide range by suitable choice of an organic substituent attached by way of acyl urea group.

The preparation of isocyanate polyaddition products containing acyl urea groups is known per se and has been described, for example, in DE-OS No. 2,436,740 and DE-OS No. 2,714,293. In these known processes, the products are either prepared in the form of solutions and converted into films to form coatings, lacquer coverings or foils (DE-OS No. 2,436,740) or the polyhydroxyl compounds containing acyl urea groups are first prepared and then converted into foams containing acyl urea groups, (DE-OS No. 2,714,293). It was not foreseeable, however, that this principle would also be applicable to the chemistry of aqueous polyurethane dispersions and in particular that the dispersions according to the invention described below of polyurethanes containing hydrophobic side chains attached by way of acyl urea groups would be at least equal in quality as paper sizes, for example to the high quality products disclosed in DE-OS No. 2,400,490. In particular, the dispersions and solutions of polyurethanes containing cationic groups and hydrophobic side chains described below are superior to the paper sizes disclosed in the last mentioned prior publication due to their improved sizing action both in alum-free paper and in alum-containing or pre-sized paper or paper containing wood.

SUMMARY OF THE INVENTION

The present invention relates to aqueous solutions or dispersions of polyisocyanate addition products which contain about 2 to 300 milliequivalents per 100 g of solids of chemically incorporated ternary or quaternary ammonium groups and up to about 25% by weight, based on solids, of chemically incorporated ethylene oxide units, —CH$_2$—CH$_2$—O—, present within a polyether chain, the ternary or quaternary ammonium groups and the ethylene oxide units being present in an amount sufficient to guarantee the solubility or dispersibility of the polyisocyanate addition products in water, characterized in that the polyisocyanate addition products contain segments built into the polymer chain corresponding to the general formula

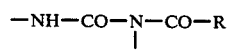

wherein
R represents a saturated or unsaturated aliphatic hydrocarbon group having 1 to 35 carbon atoms, preferably 9 to 22 carbon atoms, an aromatic hydrocarbon group having 6 to 10 carbon atoms or an araliphatic hydrocarbon group having from 7 to 10 carbon atoms or, where several groups R are present in the same molecule, they may constitute different groups conforming to the above definition for R, the total quantity of structural units of the above mentioned formula corresponding to an acylated urea group content of the formula

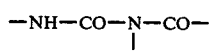

in the polyisocyanate addition product of about 0.1 to 20% by weight, based on the solids content.

The present invention also relates to a process for the preparation of these solutions or dispersions by the reaction of
(a) organic polyisocyanates and optionally organic monoisocyanates, with
(b) compounds containing isocyanate reactive groups.

In this process, the starting components (b) include components containing ternary or quaternary ammonium groups or groups capable of being converted into ternary or quaternary ammonium groups, the at least partial conversion into salt groups of this kind taking place during or after the polyaddition reaction. Components (a) and/or (b) may include compounds containing ethylene oxide units present within a polyether chain, the total quantity of such hydrophilic components being calculated to provide sufficient ternary or quaternary ammonium groups in the polyisocyanate polyaddition product to enable it to be dissolved or dispersed in water, that is about 2 to 300 milliequivalents per 100 g of solid substance and optionally 0 to about 25% weight of ethylene oxide units of the type mentioned above. The process according to the invention further includes conversion of the polyisocyanate addition product prepared as described above into an aqueous solution or dispersion during or after the addition reaction, and the process is characterized in that the starting components (a) and/or (b) contain starting components containing acyl urea groups corresponding to the formula

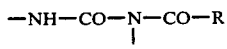

the quantity of these starting components being so calculated that the polyisocyanate addition product contains about 0.1 to 20% by weight, based on the solids content, of structural units corresponding to the formula

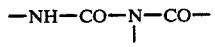

Lastly, the present invention relates to the use of the solutions or dispersions according to the invention as coating compounds for flexible or non-flexible substrates and as sizes for paper or for the preparation of sizes for paper.

DETAILED DESCRIPTION OF THE INVENTION

The dispersions according to the invention are prepared from (a) organic polyisocyanates, optionally together with monofunctional isocyanates,° (b) compounds containing at least 2 isocyanate reactive groups, optionally together with corresponding, monofunctional compounds, and optionally (c) further auxiliary agents and additives.

The following are examples of suitable starting components (a):

(a1) diisocyanates of the formula Q(NCO)$_2$, wherein Q denotes an aliphatic hydrocarbon group having 4 to 12 carbon atoms, a cycloaliphatic hydrocarbon group having 6 to 15 carbon atoms, an aromatic hydrocarbon group having 6 to 15 carbon atoms or an araliphatic hydrocarbon group having 7 to 15 carbon atoms. Examples of such diisocyanates include tetramethylene diisocyanate, hexamethylene diisocyanate, dodecamethylene diisocyanate, 1,4-diisocyanatocyclohexane, 1-isocyanato-3,3,5-trimethyl-5-isocyanatomethyl cyclohexane, 4,4'-diisocyanatodicyclohexyl methane, 4,4'-diiscoyanato-dicyclohexyl propane-(2,2), 1,4-diisocyanatobenzene, 2,4-diisocyanatotoluene, 2,6-diisocyanatotoluene, 4,4'-diisocyanatodiphenyl methane, 4,4'diisocyanato diphenyl propane-(2,2), p-xylylene-diisocyanate, α, α, α', α',-tetramethyle-m-or -p-xylylene diisocyanate, and mixture of these compounds.

The following are further examples of components (a) suitable for the purpose of this invention:

(a2) prepolymers containing isocyanate groups of the type known in polyurethane chemistry which are obtained by the reaction of simple diisocyanates of the type exemplified under (a1) with organic polyhydroxyl compounds of the type exemplified under (b1), using an NCO/OH equivalent ratio of about 1.2:1 to 10:1, preferably about 1.5:1 to 2.5:1. It will be evident from the above mentioned equivalent ratio that the term "isocyanate prepolymers" as used in the context of this invention also includes so called "semi-prepolymers" i.e. mixtures of excess, unreacted diisocyanates with isocyanate prepolymers.

Compounds suitable as starting components (a) according to the invention also include the following:

(a3) polyisocyanates containing acyl urea groups of the general formula

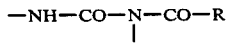

wherein R has the meaning indicated above.

Polyisocyanates containing several acyl urea groups in which the individual groups R conform to the above definition but differ from one another may also be used as component (a3).

The polyisocyanates (a3) containing acyl urea groups may be either comparatively low molecular weight or comparatively high molecular weight isocyanate prepolymers. The starting components (a3) are prepared by a method analogous to that of the teaching of DE-OS Nos. 2,436,741 by partial carbodiimidization of the isocyanate groups of organic polyisocyanates of the type exemplified under (a1) and (a2) above with subsequent chemical addition of organic carboxylic acids R—COOH to the resulting, carbodiimide-modified polyisocyanates. Typical examples of suitable starting components (a3) include diisocyanates corresponding to the following formula

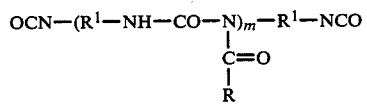

which are prepared by initially reacting the carbodiimide groups of diisocyanatocarbodiimides corresponding to the following general formula

either completely or partially with carboxylic acids of the general formula

optionally in the presence of a suitable solvent at temperatures of about 25° to 100° C.

In the above formulae,
R denotes a group of the type already indicated in the definition for R,
R$^1$ denotes a divalent hydrocarbon group optionally containing urethane, ester and/or ether groups, which is obtained by removal of the isocyanate end groups from a simple organic diisocyanate or from an isocyanate prepolymer containing urethane groups and optionally ether or ester groups, the groups R$^1$ may be either identical or different if several such groups R$^1$ are present in the same molecule, and
m represents an integer or (as a statistical average) a fraction having a value 1 to 10, preferably 1 to 4.

The method of preparation of the diisocyanatocarbodiimides is known and has been described, for example, in U.S. Pat. Nos. 2,840,589 and 2,941,966 and by P. W. Campbell and K. C. Smeltz in Journal of Organic Chemistry, 28, 2069 (1963). A particularly mild method of preparation resulting in diisocyanatocarbodiimides which are free from by-products consists of a heterogeneous catalysis according to German Offenlegungsschriften Nos. 2,504,400 and 2,552,350. The carbodiimidization of diisocyanates in the presence of very small quantities of phospholine oxide followed by blocking of the catalyst with acid chlorides has been described in DE-OS No. 2,653,120.

The starting components for the diisocyanates containing carbodiimide groups are preferably aromatic diisocyanates of the type exemplified under (a1).

Examples of suitable carboxylic acids corresponding to the formula R—COOH include acetic acid, propionic acid, hexane carboxylic acid, lauric acid, palmitic acid, stearic acid, benzoic acid, phenyl acetic acid, acrylic acid, methacrylic acid, crotonic acid, 10-undecenic acid, oleic acid and linoleic acid. Other monocarboxylic acids not corresponding to the definition for R indicated above could in principle also be used in the process according to the invention, e.g. chloroacetic acid, cyclohexane carboxylic acid, abietic acid and 4-dimethyl-aminobenzoic acid as well as monoesters and monoamides of dicarboxylic acids such as oxalic acid, malonic acid, succinic acid, maleic acid, fumaric acid or phthalic acid with monohydric alcohols or amines. The use of such special monocarboxylic acids is less preferred purely on the grounds of cost although it would constitute an entirely equivalent method of carrying out the process claimed according to the invention. Any mixtures of acids of the general formula R—COOH exemplified above could in principle also be used in the process according to the invention. The quantity of acid used is calculated to provide about 0.2 to 1.2, preferably about 0.5 to 1.2 mol of carboxyl groups per mol of carbodiimide groups in the reaction mixture.

The isocyanate prepolymers containing acyl urea groups which are also suitable as component (a3) may be prepared either by a reaction of the above mentioned polyisocyanates based on low molecular weight diisocyanates and containing acyl urea groups with subequivalent quantities of polyhydroxyl compounds of the type exemplified below under (b1) and/or (b2) or by partial carbodiimidization of isocyanate prepolymers of the type exemplified above under (a2), followed by reaction of the products of carbodiimidization with carboxylic acids R—COOH as described above.

The following are further examples of compounds. which may be used as starting components (a) for the process according to the invention:

(a4) hydrophilically modified polyisocyanates such as diisocyanates containing ethylene oxide units built into polyether side chains according to U.S. Pat. No. 3,920,598. The inclusion of such hydrophilically modified polyisocyanates is, however, less preferred since the hydrophilic groups in the process according to the invention are preferably incorporated using starting component (b) described below.

In the process according to the invention, components (a1) to (a4) exemplified above could in principle also be used in combination with higher functional low molecular weight polyisocyanates such as the reaction products of 3 mols of 2,4-diisocyanatototluene and 1 mol of trimethylol propane or in combination with mono-functional isocyanates such as phenyl isocyanate, hexyl isocyanate or n-dodecyl isocyanate. Mono-functional isocyanates containing polyether chains with built in ethylene oxide units of the type mentioned in U.S. Pat. Nos. 3,920,598 and 4,237,264 may also be used, but when such mono-functional isocyanates are used it is generally necessary to prevent premature chain breaking by simultaneously using higher than difunctional components, especially for preparing high molecular weight polyurethanes. The starting components (a) used in the process according to the invention are preferably difunctional isocyanates of the type exemplified above.

The following are examples of suitable starting components (b) for the process according to the invention:

(b1) polyhydroxy polyesters or polyethers having a molecular weight of 400 to about 4,000 known from polyurethane chemistry, preferably the difunctional compounds of this type. The polyesters may be obtained in known manner by the reaction ·of polybasic acids, in particular difunctional acids such as adipic acids, phthalic acid, tetrahydrophthalic acid and/or hexahydrophthalic acid, with excess quantities of polyhydric alcohols, preferably dihydric alcohols of the type exemplified below under (b2). The polyethers may be obtained by the alkoxylation of suitable starter molecules such as water, ammonia aniline or the polyhydric alcohols exemplified below under (b2) with alkylene oxides such as ethylene oxide and/or propylene oxide.

The following are further examples of suitable starting components (b) for the process according to the invention:

(b2) polyhydric alcohols, in particular dihydric alcohols having a molecular weight of 62 to 399, especially the alkane polyols such as ethylene glycol, propylene glycol, tetramethylene diol, hexamethylene diol, glycerol, trimethylol propane or trimethylol ethane, or low molecular weight alcohols containing ether groups such as diethylene glycol, triethylene glycol, dipropylene glycol or tripropylene glycol. Any mixtures of such alcohols may also be used in the process according to the invention.

Further examples of suitable starting components (b) for the process according to the invention are as follows:

(b3) Compounds having a molecular weight of 32 to 400 containing at least two aminic or hydrazinic amino groups such as ethylene diamine, hexamethylene diamine, isophorone diamine, 2,4-diaminotoluene, 4,4'-diaminodiphenyl methane, 4,4'-diaminodicyclohexyl methane, diethylene triamine, triethylene tetramine, hydrazine and hydrazine hydrate. Starting components of this kind may also be used in a masked form, i.e. in particular in the form of the corresponding ketimines or ketazines (reaction products with simple ketones such as acetone, methylethyl ketone or methyl isobutyl ketone). When such masked chain lengthening agents are used, the isocyanate reactive groups are not released until subjected to the hydrolytic influence of the water of dispersion.

The following are further examples of compounds suitable as starting components (b):

(b4) ionic starting components or potentially ionic starting components having a molecular weight of 60 to 400, preferably 89 to about 400, and containing at least one ternary or quaternary ammonium group or a group capable of being converted into such a group in addition to at least one isocyanate reactive group. These compounds include amino alcohols containing tertiary amine nitrogen in which the tertiary nitrogen atoms can be at least partially converted into ternary or quaternary ammonium groups by neutralization or quaternization during or after completion of the isocyanate polyaddition reaction. Specific examples include N-methyl-diethanolamine, N-butyl-diethanolamine, N-methyl-diisopropanolamine, N-ethyl-diethanolamine, N-ethyl-diisopropanolamine and N,N'-bis-(2-hydroxyethyl)-perhydropyrazine, and corresponding monohydric alcohols such as N,N-dimethyl-ethanolamine, 2-(2-dimethylamino-ethoxy)-ethanol, N-N-diethyl-ethanolamine, 2-(2-diethylamino-ethoxy)-ethanol, N,N-di-n-butyl-amino-ethanol, N-(3-hydroxypropyl)-dimethylamine, N-(2-hydroxypropyl)-dimethylamine, 1-diethylamino-2-propanol and 1,3-bis-(dimethyl amino)-2-propanol. Also included are the analoguous starting components having at least 1 tertiary amino group, i.e. a potential ternary or quaternary ammonium group, and containing, instead of the one or more than one hydroxyl group, at least one primary or secondary aminic or hydrazinic amino group, e.g. N-methyl-bis-(3-aminopropyl)-amine, N-methyl-bis-(2-aminoethyl)-amine and N,N'N"-trimethyl-diethylene triamine as well as monofunctional compounds such as 1-amino-2-diethylamino-ethane, 1-amino-3-dimethylamino-propane, 1-amino-3-diethylamino-propane and N,N-dimethyl hydrazine.

In the process according to the invention, incorporation of the ionic groups, i.e. the ternary or quaternary ammonium groups, is preferably carried out by the addition of starting components containing tertiary amino groups followed by conversion of the tertiary amino groups into the corresponding ammonium groups by neutralization with inorganic or organic acids such as hydrochloric acid, acetic acid, fumaric acid, maleic acid, lactic acid, tartaric acid, oxalic acid, N-methyl-N-(methyl- aminocarbonyl)-aminomethane sulphonic acid or phosphoric acid, or by quaternization with suitable quaternizing agents such as methyl chloride, methyl iodide, dimethyl sulphate, benzyl chloride, ethyl chloroacetate or bromo acetamide. Other examples of suitable neutralizing or quaternizing agents are disclosed in DE-OS No. 2,827,156. The neutralization or quaternization of the starting components containing tertiary nitrogen could in principle also be carried out before or during the isocyanate polyaddition reaction although this is less preferred. Furthermore, ternary or quaternary ammonium groups could be introduced into the polyisocyanate polyaddition products by way of polyether polyols containing tertiary amino groups used as starting components (b1) followed by neutralization or quaternization of the tertiary amino groups. This again is not a preferred method of carrying out the process according to the invention.

In all the variations of the process according to the invention, the quantity of starting components containing tertiary amino groups or ammonium groups and the degree of neutralization or quaternization are chosen so that the products of the process according to the invention contain about 2 to 300, preferably about 5 to 200 and most preferably about 5 to 120 milli-equivalents of ternary or quaternary ammonium groups per 100 g of solid substance.

The following are further examples of suitable starting components (b) according to the invention:
(b5) monohydric and dihydric alcohols containing ethylene oxide units built into polyether chains. The alcohols include compounds corresponding to the general formula:

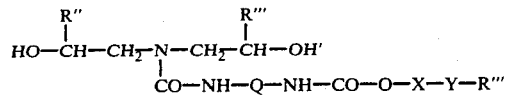

wherein
Q represents a divalent group such as may be obtained by removal of the isocyanate groups from a diisocyanate of the formula Q(NCO)$_2$ as mentioned under (a1),
R" represents hydrogen or a monovalent hydrocarbon group having 1 to 8 carbon atoms, preferably hydrogen or a methyl group,
R'" represents a monovalent hydrocarbon group having 1 to 12 carbon atoms, preferably an unsubstituted alkyl group with 1 to 4 carbon atoms,
X represents a group such as may be obtained by removal of the terminal oxygen atom from a polyalkylene oxide chain having about 5 to 90, preferably about 20 to 70 chain members, of which at least about 40%, preferably at least about 65% are ethylene oxide units and which in addition to the ethylene oxide units may include propylene oxide, butylene oxide or styrene oxide units, propylene oxide being preferred, and
Y represents oxygen or NR$^{iv}$, wherein R$^{iv}$ conforms to the definition given for R'".

Compounds corresponding to the last mentioned formulae may be prepared by the procedures disclosed in U.S. Pat Nos. 3,905,929 and 4,190,566.

Compounds corresponding to the general formula

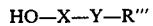

wherein
X, Y and R'" have the meaning already indicated are also preferred hydrophilic starting components (b5).

When such monofunctional, non-ionic, hydrophilic polyethers are used, it may often be advantageous to prevent premature chain breaking by adding starting components which are more than difunctional. The monofunctional polyethers corresponding to the last mentioned general formula are prepared by known processes such as those described in U.S. Pat. Nos. 3,905,929, 4,190,566 or 4,237,264.

The following are further examples of starting components (b) suitable for the purpose of the invention:
(b6) amino alcohols having a molecular weight of 61 to 300 which are free from tertiary nitrogen, e.g. ethanolamine, propanolamine, diethanolamine or dipropanolamine.

Also suitable are
(b7) polyhydric, preferably dihydric, alcohols containing acyl urea groups such as those obtained by a reaction of the diisocyanates containing acyl urea groups exemplified under (a3), in particular those based on low molecular weight starting diisocyanates, with the compounds exemplified under (b1) (b2) and/or (b6) using an OH/NCO equivalent ratio of about 1.2:1 to 30:1 or, when amino alcohols (b6) are used, an NH$_2$/NCO ratio of about 0.6:1 to 1.2:1. Preferably these compounds are prepared by reaction of the polyisocyanates containing carbodiimide groups mentioned under the definition of component (a3), preferably diisocyanates based on low molecular weight starting isocyanates, with the above mentioned polyhydroxyl compounds using an OH/NCO equivalent ratio of about 1.2:1 to 30:1 or, when amino alcohols (b6) are used, an $NH_2$/NCO equivalent ratio of about 0.6:1 to 1.2:1, followed by a reaction of the reaction products with carboxylic acids R—COOH in accordance with the particulars given above. When starting materials (b1) and/or b2 containing hydroxyl groups are used, the reaction of the polyhydroxyl component with the isocyanate component is preferably carried out at an OH/NCO equivalent ratio of about 1.5:1 to 15:1, in particular about 1.5:1 to 3:1. Preparation of the starting components (b7) containing hydroxyl groups and of their intermediate products containing carbodiimide groups used for the preparation of the hydroxyl compounds (b7) is generally carried out at a temperature of about 25 to 130° C., preferably about 50° to 120° C., optionally in the presence of an inert solvent of the type exemplified in DE-OS No. 2,714,293. Details of the preparation of such polyhydroxyl compounds containing acyl urea groups are also given in this publication.

Lastly, as suitable starting component (b) for the purpose of the invention should also be mentioned (b8) water, which can serve both as continuous phase of the dispersions according to the invention and as chain lengthening agent.

The starting components (b) used for the process according to the invention are preferably difunctional in isocyanate addition reactions although, as already mentioned above, monofunctional starting components (b) may also be used, in particular compounds of the type mentioned under (b4) or (b5), or higher than difunctional components (b) may be used for the purpose of obtaining chain branching of the molecule if desired.

The following are examples of auxiliary agents and additives (c) which may be used in the process according to the invention:

(c1) solvents optionally used for the synthesis of the polyurethanes. Examples of suitable solvents include toluene, xylene, acetone, methyl glycol acetate, ethyl glycol acetate, butyl acetate, N-methyl pyrrolidone, ethyl acetate and methyl ethyl ketone. It is preferred to use water miscible solvents such as acetone or N-methyl pyrrolidone.

The following may also be used as auxiliary agents and additives (c) in the process according to the invention:

(c2) compounds which react with isocyanate groups to form acylated amino groups and compounds capable of reacting with such acylated amino groups to undergo a condensation reaction. The first mentioned compounds include ammonia and urea, while the latter compounds include aldehydes, in particular formaldehyde. Auxiliary agents and additives (c2) are used when the "melt dispersion process" is carried out, as will be explained below.

The following are examples of auxiliary agents and additives (c) optionally used: (c3) known accelerators for the isocyanate polyaddition reaction used in polyurethane chemistry. The use of such catalysts, however, is generally not necessary.

Further examples of auxiliary agents and additives (c) optionally used are as follows:

(c4) emulsifiers which are not chemically incorporated and are preferably non-ionic. These are optionally used in addition to the chemically incorporated emulsifiers but are, of course, not essential. Examples of such emulsifiers include ethoxylated nonyl phenol, polyoxyethylene-lauryl ether and polyoxyethylene-laurate, -oleate and -stearate. These additives generally contain 8 to 50 oxyethylene units per molecule. The external emulsifiers may be added to the products of the process after completion of the isocyanate addition reaction in order to improve their solubility or dispersibility in water. The additional oxyethylene units thereby introduced into the solutions or dispersions according to the invention are not taken into account when calculating the ethylene oxide unit content of the polyisocyanate addition products since the quantity of ethylene oxide units indicated refers solely to the number of such units which are chemically incorporated.

The auxiliary agents and additives (c) optionally used also include the usual additives such as inert fillers, pigments, dyes, plasticizers and additives which influence the flow properties.

The process according to the invention, i.e. preparation of the dispersions according to the invention, may be carried out using methods known in the art. Whatever variation of the process according to the invention is carried out, however, the following conditions should be observed:

The starting components containing ionic groups or potentional ionic groups (b4 and/or when polyether polyols containing tertiary amine nitrogen atoms are used, optionally also b1) should be incorporated in such a quantity in the polyisocyanate addition product and the degree of neutralization of the potential ionic groups incorporated in the polyurethanes should be such that the polyisocyanate addition products have about 2 to 300, preferably about 5 to 200 and in particular about 5 to 120 milliequivalents of incorporated ternary or quaternary ammonium groups per 100 g of solids content. It is necessary to ensure that the ionic group content of the polyisocyanate addition products together with any non-ionic hydrophilic groups optionally present is sufficient to render the polyisocyanate addition products soluble or dispersible in water.

(ii) Any starting components containing non-ionic hydrophilic groups (a4 and/or b5) should be present in such a quantity that the polyisocyanate addition products contain at most about 25% by weight, preferably at most about 20% by weight and most preferably not more than about 15% by weight of ethylene oxide units, —$CH_2$—CH—$_2$—O—, within the polyether chains, based on the solids content.

(iii) Finally, the quantity of starting components containing acyl urea groups (a3 and/or b7) should be such that the polyisocyanate addition products contain about 0.1 to 20% by weight, preferably about 2 to 15% by weight, of structural units of the formula

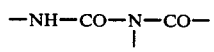

As already mentioned above, the process according to the invention may be carried out by any of several known methods.

1. The "acetone process" is carried out in a manner analogous to the teaching of DE-OS No. 1,495,745 (=U.S. Pat. No. 3,479,310) or DE-OS No. 1,495,847 (=G.B. Pat. No. 1,076,788). A prepolymer containing isocyanate end groups is prepared either solvent free or in the presence of solvents of the type exemplified under (c3). The starting materials used in this case are in particular simple diisocyanates of the type mentioned under (a1), optionally relatively high molecular weight polyhydroxyl compounds of the type mentioned under (b1), optionally chain lengthening agents of the type exemplified under (b2) as well as under (b3), ionic starting components of the type exemplified under (b4) or the corresponding potential ionic starting components and optionally non-ionic hydrophilic starting components of the type exemplified under (b5), together with starting components containing acyl urea groups exemplified under (a3) and/or (b7). In this process, an isocyanate prepolymer is generally first prepared and this is then dissolved in a suitable solvent, whereupon chain lengthening is carried out in solution to form the polyurethane. The incorporation of ionic groups is achieved during preparation of the polymer by means of suitable ionic or potential ionic starting components (b4) and/or during chain lengthening by means of low molecular weight, difunctional ionic or potential ionic starting components of the type exemplified under (b4). The potential ionic groups are converted into ionic groups before or during dispersion in water. In this embodiment, it is preferred to use difunctional starting components of the type exemplified. The equivalent ratio of isocyanate groups to isocyanate reactive groups is preferably about 0.7:1 to 2:1. The solution of the resulting polyurethane is then mixed with water which optionally contains neutralizing agents of the type exemplified under (b4) for the purpose of neutralizing any potential ionic groups present. After mixing the polyurethane solution with water, the solvent may, if desired, be removed from the resulting aqueous polyurethane dispersion by distillation. In this embodiment, conversion of any tertiary nitrogen atoms present into quaternary nitrogen atoms may be achieved by quaternization of the polyisocyanate addition product present in solution. According to one variation of this embodiment, separately prepared isocyanate prepolymers of the type exemplified under (a2) are reacted in solution with the starting components containing acyl urea groups mentioned under (a3) and/or (b7) and preferably low molecular weight ionic starting components of the type mentioned under (b4) and optionally non-ionic hydrophilic starting components of the type mentioned under (b5) and the reaction mixture is then mixed with water after the reaction.

2. Another embodiment of the process according to the invention is similar to that disclosed in DE-OS No. 2,725,589, U.S. Pat. Nos. 4,269,748, 4,192,937 or 4,292,226, in which masked chain lengthening agents of the type mentioned under (b3) are used as chain lengthening agents. U.S. Pat. No. 4,192,937 discloses oxazolidines as chain lengthening agents or U.S. Pat. No. 4,292,226 wherein amine salts are used as chain lengthening agents. In these processes, isocyanate prepolymers which have previously been prepared solvent free or in solution from the starting materials exemplified above with the addition of starting components containing acyl urea groups exemplified under (a3) and/or (b7) and ionic starting components of the type mentioned under (b4) and optionally non-ionic hydrophilic starting components of the type mentioned under (b5) are mixed with the above mentioned masked chain lengthening agents at an equivalent ratio of isocyanate groups to isocyanate reactive groups of about 1.2:1 to 3:1. Water is then added to the resulting mixture to liberate the previously masked amine or hydrazine for reaction as a chain lengthening agent with the prepolymer. In this procedure, the water may again contain, in solution, the neutralizing agent for any potential ionic groups present. This embodiment also may include quaternization of the polyisocyanate addition product, either solvent free or in solution before addition of the masked chain lengthening agent.

3. Another embodiment of the process according to the invention corresponds to the "melt dispersion process" disclosed in U.S. Pat. No. 3,756,992, in which isocyanate end groups of hydrophilically modified prepolymers are reacted with urea, ammonia or other suitable compounds under solvent free conditions to form acylated amines which in turn are converted into methylol groups by a reaction with formaldehyde before, during or after the addition of water. The products containing methylol groups, which are dissolved or dispersed in water, may then be converted into high molecular weight polyurethanes, for example by heating to a temperature of about 50 to 150° C., whereby the reactive methylol groups undergo a condensation reaction. Here again, any tertiary nitrogen atoms present may be quaternized before the addition of water. The isocyanate prepolymers used in this embodiment are prepared, as in the second embodiment with the aid of the starting components (a3) and/or (b7) which are essential components for the invention.

4. In another method of carrying out the process according to the invention, prepolymers containing isocyanate groups and the starting components (a3) and/or (b7) which are essential to the invention, are first dispersed in water optionally containing the neutralizing agent required for neutralizing the potential ionic groups, and the resulting aqueous dispersion is then mixed with an aminic or hydrazinic chain lengthening or cross linking agent of the type mentioned under (b3) containing free amino groups, at an NCO/NH equivalent ratio of about 1:0.2 to 1:1.1, preferably about 1:0.3 to 1:0.98. Chain lengthening is then carried out at about 5 to 90° C., preferably about 20° to 80° C. Again, quaternization of the isocyanate prepolymers optionally containing tertiary nitrogen atoms could conceivably be carried out before the dispersion in water.

If starting components (b4) and/or (b1) containing tertiary nitrogen atoms are used and quaternization is subsequently carried out or if the corresponding compounds already containing quaternized tertiary nitrogen atoms are used, preparation of the solutions or dispersions according to the invention could in principle be conducted by first carrying out the isocyanate addition reaction using starting materials containing carbodiimide groups corresponding to compounds (a3) and/or (b7) and then carrying out the chemical addition of the carboxylic acid with formation of acyl urea groups after the isocyanate addition reaction. Such a procedure, however, is less advantageous than the described embodiments of the process according to the invention.

The properties of the polyurethanes, in particular their molecular weight can be varied within wide limits and adapted to their particular purpose by suitable choice of the starting components and of the equivalent ratios employed in the various embodiments. In the context of the present invention, the terms "polyisocyanate addition products" and "polyisocyanate polyaddition products" thus also include comparatively low molecular weight reaction products which may be prepared by the ionic modification of isocyanates containing acyl urea groups with monohydric alcohols containing tertiary amino groups, followed by neutralization or quaternization without any further chain lengthening of the molecule.

Conversion of the solutions or solvent-free preparations of the polyisocyanate addition products or prepolymers obtained according to the various embodiments into an aqueous solution or dispersion may in principle be carried out by various methods. Apparatus producing high shearing gradients or non-chemical dispersing agents such as extremely high frequency sound waves may be used, but are generally not necessary since simple mixing apparatus such as stirrer vessels or so called reflux mixers are sufficient for dispersing the polyisocyanate addition products or prepolymers which are generally self dispersing. For the same reason, polyisocyanate addition products according to the invention could in principle be obtained in a solid form, i.e. in the form of powders, resins or lumps, and these materials can be dispersed or dissolved in a separate step.

Furthermore, it has surprisingly been found that salt formation of the potential hydrophilic groups can initially be carried out to such an extent that only relatively coarse dispersions or suspensions are obtained and these may subsequently be converted into finely divided dispersions or solutions by the further addition of neutralizing agents. Owing to the low viscosity of the coarse intermediates, they can be prepared at higher concentrations, thereby reducing the transport costs.

If desired, the dispersions according to the invention may subsequently be modified with isocyanates by a procedure analogous to that disclosed in DE-OS No. 2,708,242.

In all the various embodiments of the process according to the invention, the quantity of water used is generally calculated to result in solutions or dispersions having a solids content of less than about 60% by weight, preferably about 10 to 60% by weight, most preferably about 10 to 50% by weight. The particle diameter of the dispersed solids is generally below about 1 μm, preferably about 0.001 to 0.5 μm. The average particle diameter should be below about 0.5 μm and preferably in the range of about 0.01 to 0.3 μm.

If the hydrophilic group content is very low, average particle diameters of about 5μ to 50μ may be obtained. Such dispersions are of interest, for example, for the preparation of polyurethane powders.

If the dissolved or dispersed polyisocyanate addition products also contain ethylene oxide units as hydrophilic groups, they are to a large extent insensitive to electrolytes in spite of containing ionic groups.

The solutions or dispersions may be mixed with other dispersions, e.g. with polyvinyl acetate or dispersions of polyethylene, polystyrene, polybutadiene, polyvinyl chloride, polyacrylate and copolymer resins. Known emulsifiers which are not chemically fixed and are preferably non-ionic may also be added, as already mentioned above, but they are, of course, not essential.

Finally, fillers, plasticizers, pigments, carbon black sols and silica sols, aluminum dispersions and clay and asbestos dispersions may also be incorporated in the above mentioned dispersions.

The solutions and dispersions according to the invention are in most cases stable and suitable for storage and transport and may be processed at any subsequent date, e.g. for molding or otherwise shaping them. They generally dry on their own to form dimensionally stable plastic coatings although shaping of the products of the process may also be carried out in the presence of known cross linking agents.

The products obtained vary in their properties according to the nature of the acyl urea groups contained in them. Thus, valuable paper sizes may be obtained by the incorporation of relatively long chained fatty acids R-COOH containing at least 10 carbon atoms.

Another advantage is the problem free introduction of double bonds in side chains by the incorporation of unsaturated carboxylic acids R-COOH, which provides the possibility of subsequent cross linking.

Furthermore, the hydrophilic or hydrophobic characteristics of the products can easily be controlled by suitable choice of the acyl urea groups in side chains.

The products of the process are suitable for coating, covering and impregnating woven and non-woven textiles, leather, paper, wood, metal, ceramics, stone, concrete, bitumen, hard fiber, straw, glass, porcelain, a wide variety of plastics, and glass fibers. They are capable of forming anti-static and crease resistant finishes and may be used as binders for non-woven webs, adhesives, adhesifying agents, laminating compounds, hydrophobicizing agents, plasticizers and bonding agents, e.g. for cork powder or wood powder, glass fibers, asbestos, paper type materials, plastics and rubber waste and ceramic materials. They may also be used as auxiliary agents in textile printing and in the paper industry as additives for polymers and as sizing agents, for example for glass fibers, and for dressing leather.

Dispersions and particularly solutions according to the invention of polyisocyanate addition products containing acyl urea groups in which the hydrophilic centers are exclusively ammonium groups and which have a molecular weight, calculated from the nature and stoichiometric proportions of the starting materials, of about 600 to 10,000, preferably about 800 to 5,000 and most preferably about 800 to 3,000, are particularly suitable for sizing paper. These low molecular weight polyisocyanate addition products are preferably prepared without the aid of the relatively high molecular weight polyhydroxyl compounds of the type exemplified under (b1) and optionally with the addition of chain breakers, e.g. monofunctional alcohols such as methanol, ethanol, n-butanol or n-octanol. An isocyanate prepolymer is first prepared from difunctional starting materials, using an excess of NCO, and this prepolymer is then reacted with the chain breaking agent.

When the dispersions or solutions according to the invention, in particular the last mentioned solutions of comparatively low molecular weight polyisocyanate addition products containing cationic groups, are used as paper sizes for the preparation of paper sizes, the usual additives for paper sizes may be employed such as alum or cationic or anionic auxiliaries based on cationic starch or quaternized polyamines, quaternized polyamidamine, quaternized basic formaldehyde resins, methyl cellulose, carboxy methyl cellulose, lignin sulphonic acids, starches and polysaccharides of various origin, xanthane, pullulan, chitosan, and polymers or copolymers of (meth) acrylic acid, (meth) acrylamide, maleic, fumaric or itaconic acid or other polymers and copolymers containing carboxylic or sulphonic acid groups, optionally in salt form, or collagen, gelatine, alginates or carageenates.

The effect of the sizes according to the invention is not impaired by the addition of white toners. Furthermore, the aqueous preparations can be obtained without the aid of emulsifying agents although such agents may be used if desired.

The sizes, used alone or in combination with other sizes, are particularly suitable for the surface sizing of paper but may, of course, also be used for internal sizing. They may be used not only for paper containing chalk or kaolin but also for paper which is free from filter or contains a different type of filler, e.g. talcum or gypsum. The sizes are also suitable for sizing cellulose materials such as cardboard, textiles, leather, carton, woodchip board or insulating board.

The invention will be described below by way of examples. The parts, proportions and percentages given refer to weight unless otherwise indicated.

EXAMPLES

Example 1

90.7 parts (0.52 mol) of a mixture of 2,4-tolylene diisocyanate and 2,6-tolylene diisocyanate (proportions 65:35) were carbodiimidized with 0.1 ml of a solution of a commercial mixture of 1-methyl-1-phospha-2-cyclopentene-1-oxide and 1-methyl-1-phospha-3-cyclo- pentene-1-oxide in N-methyl-pyrrolidone (1:6) as catalyst at 60° C. When the isocyanate content reached 20.6%, the reaction was stopped with 0.1 ml of phosphorus trichloride and the mixture was stirred for 30 minutes. The isocyanate content reached a constant value of 19.8%. 32.2 parts (0.36 mol) of butane-1,4-diol and 52 parts of acetone were then added. After 30 minutes, the isocyanate content had fallen to 0%. 64.8 parts (0.228 mol) of stearic acid were added at 60° C. and the mixture was reacted for 40 minutes until an acid number of 0 was obtained. A further 82.2 parts (0.47 mol) of a mixture of 2,4-tolylene diisocyanate and 2,6-tolylene diisocyanate (ratio 65:35) were then added and the mixture was reacted at 60° C. until an isocyanate value of 8.0% was obtained. 200 parts of acetone were added for dilution, and 29.9 parts (0.25 mol) of N-methyl-diethanolamine were added at 60° C., followed, after 10 minutes, by 6.4 parts (0.086 mol) of n-butanol. When the isocyanate content had fallen to 0%, salt formation was carried out by the addition of 22.6 parts (0.25 mol) of DL-lactic acid, and 731 parts of water were used to form dispersion after 30 minutes stirring. The acetone was drawn off immediately thereafter. A finely divided dispersion having a solids content of 32% by weight and containing 80 milliequivalents of quaternary ammonium groups per 100 g of solid substance and 6.2% of acylated urea groups,

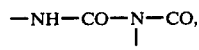

based on the solids content was obtained.

Example 2

87 parts (0.5 mol) of a mixture of 2,4-tolylene diisocyanate and 2,6-tolylene diisocyanate (ratio 65:35) were carbodiimidized with 0.1 ml of a solution of a commercial mixture of 1-methyl-1-phospha-2-cylclopentene-1-oxide and 1-methyl-1-phospha-3-cyclopentene-1-oxide in N-methyl-pyrrolidone (1:6) as catalyst at 60° C. The reaction was stopped at an isocyanate content of 20.6% by the addition of 0.1 ml of phosphorus trichloride and then stirred for 30 minutes. The isocyanate content reached a constant value of 20.0%. 31.1 parts (0.35 mol) of butane-1,4-diol and 50 parts of acetone were then added. After 30 minutes, the isocyanate content had fallen to 0%. 62.1 parts by weight (0.218 mol) of stearic acid were added at 60° C. and the mixture was reacted for 40 minutes to an acid number of 0. A further 49.2 parts (0.28 mol) of a mixture of 2,4-tolylene diisocyanate and 2,6-tolylene diisocyanate (ratio 65:35) were then added and the reaction was continued to an isocyanate value of 3.5% at 60° C. 200 parts of acetone were added for dilution and the reaction was stopped with 19.6 parts (0.25 mol) of N,N-dimethyl-ethanolamine at 60° C. When the isocyanate content had fallen to 0%, 80.1 parts by weight (0.22 mol) of a 50% solution of N-methyl-N-(methylaminocarbonyl)-aminomethane sulphonic acid in water was added for salt formation and the reaction mixture was dispersed after 30 minutes stirring by the addition of 600 parts by weight of water. The acetone was drawn off immediately thereafter and a finely divided dispersion having a solids content of 30%, a quaternary ammonium group content of 80 milliequivalents per 100 g of solid substance and an acylated urea group content,

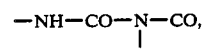

of 6.8%, based on the solids content, was obtained.

Example 3

87 parts (0.5 mol) of a mixture of 2,4-tolylene diisocyanate and 2,6-tolylene diisocyanate (ratio 65:35) were carbodiimidized at 60° C. using 0.1 ml of a solution of a commercial mixture of 1-methyl-1-phospha-2-cyclopentene-1-oxide and 1-methyl-1-phospha-3-cyclopentene-1-oxide in N-methyl pyrrolidone (1:6) as catalyst. The reaction was stopped with 0.1 ml of phosphorus trichloride when the isocyanate content was 19.6% and stirring was then continued for 30 minutes. The isocyanate content settled at a constant value of 18.7%. The reaction product was diluted with 50 parts of acetone, and 64.5 parts (0.23 mol) of stearic acid were then added at 60° C. When the acid number was 0, a further 200 parts of acetone was added for dilution. 8.9 parts (0.12 mol) of n-butanol were then added, followed after 10 minutes by 17.8 parts (0.2 mol) of N,N-dimethyl ethanolamine. The mixture was reacted at 60° C. until the isocyanate content was reduced to 0%. Salt formation was then carried out by the addition of 72.8 parts (0.2 mol) of a 50% solution of N-methyl-N-(methyl-aminocarbonyl)-aminomethane sulphonic acid in water, and the reaction mixture was dispersed with 430 parts of water after 30 minutes. The acetone was distilled off immediately thereafter. A finely divided dispersion having a solids content of 32%, a quaternary ammonium group content of 100 milliequivalents per 100 g of solid substance and an acylated urea group content,

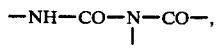

of 9.0%, based on the solids content was obtained.

Example 4

87 parts (0.5 mol) of a mixture of 2,4-tolylene diisocyanate and 2,6-tolylene diisocyanate (ratio 65:35) were carbodiimidized at 60° C. with 0.1 ml of a solution of a commercial mixture of 1-methyl-1-phospha-2-cyclopentene-1-oxide and 1-methyl-1-phospha-3-cyclopentene-1-oxide in N-methyl pyrrolidone (1:6) as catalyst. The reaction was stopped with 0.1 ml of phosphorus trichloride when the isocyanate content was 21.7% and the mixture was then stirred for 30 minutes. The isocyanate content reached a constant value of 20.0%. The reaction product was diluted with 50 parts of acetone, and 62.0 parts (0.23 mol) of stearic acid were added at 60° C. 31.1 parts (0.35 mol) of butane-1,4-diol were added after 60 minutes and the reaction was continued to an isocyanate content of 0%. A further 49.2 parts (0.28 mol) of a mixture of 2,4-tolylene diisocyanate and 2,6-tolylene diisocyanate (ratio 65:35) was then added and the reaction was continued at 60° C. to an isocyanate value of 3.5%. The reaction mixture was then diluted with 200 parts of acetone and the reaction was stopped at 60° C. with 19.6 parts (0.25 mol) of N,N-dimethyl ethanolamine. When the isocyanate value had fallen to 0%, salt formation was carried out with 80.1 parts (0.22 mol) of a 50% solution of N-methyl-N-(methylaminocarbonyl)-aminomethane sulphonic acid in water, and the reaction mixture was dispersed with 600 parts of water after 30 minutes stirring. The acetone was drawn off immediately thereafter. A finely divided dispersion having a solids content of 27%, a quaternary ammonium group content of 80 milliequivalents per 100 g of solid substance and an acylated urea group content,

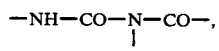

of 6.8%, based on the solid substance, was obtained.

Example 5

87 parts (0.5 mol) of a mixture of 2,4-tolylene diisocyanate and 2,6-tolylene diisocyanate (ratio 65:35) were carbodiimidized at 60° C. with 0.1 ml of a solution of a commercial mixture of 1-methyl-1-phospha-2-cyclopentene-1-oxide and 1-methyl-1-phospha-3-cyclopentene-1-oxide in N-methyl pyrrolidone (1:6) as catalyst. The reaction was stopped at an isocyanate content of 20.1% by the addition of 0.1 ml of phosphorus trichloride and the mixture was then stirred for 30 minutes. The isocyanate content reached a constant value of 18.5%. The reaction product was diluted with 50 parts of acetone, and 64.7 parts by weight (0.23 mol) of stearic acid were added at 60° C. When the acid number had fallen to 0, the reaction mixture was diluted with a further 200 parts of acetone 8.7 parts (0.12 mol) of n-butanol were then added, followed after 10 minutes by 17.8 parts by weight (0.2 mol) of N,N-dimethyl ethanolamine, and the reaction was continued at 60° C. to an isocyanate content of 0%. Salt formation was then carried out by the addition of 72.8 parts (0.2 mol) of a 50% solution of N-methyl-N-(methylaminocarbonyl)-aminomethane sulphonic acid in water. The acetone was distilled off immediately thereafter. A crystalline solid which could be ground down to powder form and dispersed at any convenient time thereafter was obtained. The solid substance contained 100 milliequivalents of quaternary ammonium groups per 100 g of solid and 9% of acylated urea groups,

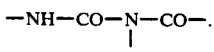

Example 6

174 parts (1.0 mol) of a mixture of 2,4-tolylene diisocyanate and 2,6-tolylene diisocyanate (ratio 65:35) were carbodiimidized at 60° C. with 0.2 ml of a solution of a commercial mixture of 1-methyl-phospha-2-cyclo-pentene-1-oxide and 1-methyl-1-phospha-3-cyclopentene-1-oxide in N-methyl pyrrolidone (1:6) as catalyst. The reaction was stopped at an NCO content of 27.7% by the addition of 0.2 ml of phosphorus trichloride and the mixture was stirred for 30 minutes. The isocyanate content reached a constant value of 25.8%. 101.8 parts (0.36 mol) of stearic acid were added to the reaction product at 60° C. and the mixture was reacted for 2 hours. The resulting reaction product containing acylated urea groups had an isocyanate content of 16.6%.

100 parts (0.117 mol) of a polyester diol of adipic acid and hexanediol (OH number 133.6) and 12 parts by weight of a polyethylene oxide/polypropylene oxide polyether (OH number 26: 73.3% ethylene oxide) which had been started on butanol were dehydrated in a water jet vacuum for 30 minutes at 110° C. The mixture was cooled to 80° C. and 32.1 parts (0.145 mol) of isophorone diisocyanate and 78.9 parts (0.145 mol) of the above-mentioned polyisocyanate containing acylated urea groups were added and the temperature was raised to 100° C. The isocyanate content reached a constant value of 3.4%. 4.2 parts by weight of n-butanol were then added and the reaction mixture was diluted with 900 ml of acetone. The temperature fell to 50° C. 1.1 parts (0.222 mol) of hydrazine hydrate and after 5 minutes 6.37 parts (0.044 mol) of N,N-bis-(3-aminopropyl)-methylamine in 50 parts of acetone were added for chain lengthening at 50° C. After 10 minutes, salt formation was carried out by the addition of 3.95 parts (0.044 mol) of DL-lactic acid in 20 parts of water, and the reaction product was dispersed in 550 parts of water after a further 10 minutes. The acetone was drawn off under vacuum immediately thereafter. A finely divided dispersion having a solids content of 30% and containing 20 milliequivalents of quaternary ammonium groups per 100 g of solid substance, 3.8% of ethylene oxide units built into a polyether chain and 3.9% of acylated urea groups, based on the solids content, was obtained.

Example 7

522 parts by weight (5.0 mol) of a mixture of 2,4-tolylene diisocyanate and 2,6-tolylene diisocyanate (ratio 65:35) were carbodiimidized at 60° C. with 0.6 ml of a solution of a commercial mixture of 1-methyl-1-phospha-2-cyclopentene-1-oxide and 1-methyl-1-phospha-3-cyclopentene-1-oxide in N-methyl pyrrolidone (1:6) as catalyst. The reaction was stopped with 0.2 ml of phosphorus trichloride when the NCO content reached a value of 28.9% and the mixture was then stirred for 30 minutes. The isocyanate content reached a constant value of 26.5%. 90.2 parts (1.05 mol) of methacrylic acid were added to the reaction mixture at 60° C. and the mixture was reacted for 2 hours. The resulting reaction product containing acylated urea groups had an isocyanate content of 22.5%.

100 parts (0.117 mol) of a polyester diol of adipic acid and hexanediol (OH number: 133.6) and 12 parts of a polyethylene oxide/polypropylene oxide polyether (OH number 26: 73.3% ethylene oxide) which had been started on butanol were dehydrated in a water jet vacuum at 110° C. for 30 minutes. The mixture was cooled to 80° C., and 32.1 parts (0.145 mol) of isophorone diisocyanate and 54.0 parts by weight (0.145 mol) of the above-mentioned polyisocyanate containing acylated urea groups were added. 6.41 parts (0.071 mol) of butane-1,4-diol were added after a reaction time of 1 hour and the temperature was raised to 100° C. The isocyanate content reached a constant value of 3.9%. The reaction mixture was then diluted with 900 ml of acetone the temperature fell to 50° C. Chain lengthening was then carried out by the addition of 1.1 parts (0.022 mol) of hydrazine hydrate at 50° C., followed after 5 minutes by the addition of 6.44 parts (0.044 mol) of N,N-bis-(3-aminopropyl)-methylamine in 50 parts by weight of acetone. Salt formation was carried out after 10 minutes by the addition of 4.0 parts (0.044 mol) of DL-lactic acid in 20 parts of water and the reaction product was dispersed in 484 parts of water after a further 10 minutes. The acetone was drawn off under vacuum immediately thereafter. A finely divided dispersion having a solids content of 30% and containing 20 milliequivalents of quaternary ammonium groups per 100 g of solid substance, 4.4% of ethylene oxide units built into a polyether chain and 4.1% of acylated urea groups, based on the solids content, was obtained.

In the following examples of practical application, the dispersion prepared according to Example 1 was investigated for its suitability as a sizing agent for paper.

Examples of Practical Application

These examples of practical application demonstrate the good sizing properties of the products according to the invention on various qualities of paper differing in their material composition. The Cobb value (according to DIN 53 132) was determined as a measure of the special sizing effect.

The papers used had the following compositions: (a) Paper free from alum

50% pine wood cellulose, 50% hard wood cellulose, 10.5% clay ash, pH in breast box: 7.3%: wet absorption in a laboratory sizing press: about 80%: weight of paper: 80 g /m². (b) Paper containing alum 50% pine wood cellulose, 50% hard wood cellulose, 1% alum, 11.8% clay ash, pH in breast box: 4.4%: water absorption about 80%: weight of paper: 80 g/m².

(c) Pre-sized paper

50% pine wood cellulose, 50% hard wood cellulose, 1% alum, 0.1% bewoid size, 11.9% clay ash, pH in breast box: 4.5: wet absorption about 60%; weight of paper: 80 g/m² .

(d) Paper containing chalk 50% pine wood cellulose, 50% hard wood cellulose, 10.9% chalk ash, pH in breast box: 7.5: wet absorption: about 90%: weight of paper: 75 g/m².

(e) Paper containing wood 40% pine wood cellulose, 60% wood pulp, 12.0% clay ash, pH in breast box: 4.5: wet absorption: about 40%: weight of paper: 75 g/m².

The paper was sized in a laboratory press of Mathis, Zurich/Switzerland, type HF. The sizing liquor used was a solution of 5% by weight of commercial starch and 0.2 to 0.6% by weight of the size to be examined (calculated as 100% active substance) in water.

The surface sized paper was dried on a drying cylinder at about 100° C. for 1 minute. The paper had been air conditioned at room temperature for 2 hours before the size was tested. The results obtained are given in Table 1.

TABLE 1

| Type of Paper | Quantity used % of liquor | sizing effect* |
| --- | --- | --- |
| (a) free from alum | 0.36 | 28.2 |
| (b) containing alum | 0.36 | 65 |
| (c) pre-sized | 0.36 | 25.2 |
| (d) containing chalk | 0.36 | 26.2 |
| (e) containing wood | 0.36 | 19.5 |

*The Cobb values are given in g/m² of water absorption in 60 seconds, determined according to DIN 52 132.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous solution or dispersion of a polyisocyanate addition product which contains about 2 to 300 milliequivalents per 100 g of solids of chemically incorporated ternary or quaternary ammonium groups and up to about 25% by weight, based on solids, of chemically incorporated ethylene oxide units, —$CH_2$—$CH_2$—O—, present within a polyether chain, said ternary or quaternary ammonium groups and said ethylene oxide units being present in an amount sufficient to guarantee the solubility or dispersibility of said polyisocyanate addition product in water, said polyisocyanate addition product additionally containing structural units corresponding to the formula

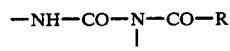

wherein
R represents a saturated or unsaturated aliphatic hydrocarbon radical having from 1 to 35 carbon atoms, an aromatic hydrocarbon group having 6 to 10 carbon atoms or an araliphatic hydrocarbon group having 7 to 10 carbon atoms, or if several radicals are present in the same molecule, R may represent different radicals corresponding to this definition:
said polyisocyanate addition product containing a total of incorporated structural units as set forth in the above formula such that the quantity of acylated urea groups corresponding to the formula

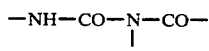

is about 0.1 to 20% by weight.

2. A process for the production of an aqueous solution or dispersion of a polyisocyanated addition product which comprises reacting
 (a) an organic polyisocyanate with
 (b) an isocyanate-reactive compound, said isocyanate-reactive compound containing about 2 to 300 milliequivalents per 100 g of solid of chemically incorporated ternary and/or quaternary ammonium groups and up to about 25% by weight of chemically incorporated ethylene oxide units, $-CH_2-CH_2-O-$, in a polyether chain, said ternary or quaternary ammonium groups and said ethylene oxide units being present in an amount sufficient to guarantee the solubility or dispersibility of said polyisocyanate addition product in water, components (a) and/or (b) containing acyl urea groups corresponding to the formula

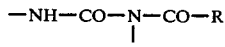

in an amount of about 0.1 to 20% by weight, based on solids, of structural units corresponding to the formula

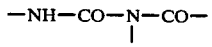

and converting the reaction mixture into an aqueous solution or dispersion during or subsequent to the reaction between components (a) and (b).

3. In a process for sizing paper, the improvement which comprises using the polyisocyanate addition product of claim 1 as the sizing agent.

* * * * *